(12) United States Patent
Oguri et al.

(10) Patent No.: US 6,199,924 B1
(45) Date of Patent: Mar. 13, 2001

(54) IMPACT ENERGY ABSORPTION STRUCTURE FOR MOTOR VEHICLE

(75) Inventors: Takemi Oguri, Kiryu; Takashi Tawarayama, Gunma; Noboru Takahashi, Isesaki; Akihiro Miyajima, Kuki, all of (JP)

(73) Assignee: Fuji JukogyoKabushiki Kaisha, Tokyo (JP)

( * ) Notice: Subject to any disclaimer, the term of this patent is extended or adjusted under 35 U.S.C. 154(b) by 0 days.

(21) Appl. No.: 09/517,313

(22) Filed: Mar. 2, 2000

Related U.S. Application Data

(62) Division of application No. 09/016,357, filed on Jan. 30, 1998, now Pat. No. 6,056,337.

(30) Foreign Application Priority Data

May 21, 1997 (JP) ........................................ 9-54111

(51) Int. Cl.⁷ .................................................. B60R 19/44
(52) U.S. Cl. ...................... 293/142; 293/143; 293/133; 293/136
(58) Field of Search ................................. 293/133, 135, 293/136, 132, 142, 143

(56) References Cited

U.S. PATENT DOCUMENTS

| | | | |
|---|---|---|---|
| 1,465,245 | 8/1923 | Nobles | 293/142 |
| 1,532,487 | 4/1925 | Hayes | 293/142 |
| 1,554,657 | 9/1925 | Rapeport | 293/143 |
| 1,561,074 | 11/1925 | Harvey | 293/143 |
| 2,054,838 | 9/1936 | Short | 293/142 |
| 2,063,957 | 12/1936 | Short | 293/142 |
| 2,672,363 | 3/1954 | Buchanan | 293/143 |
| 2,954,256 | 9/1960 | Barenyi | 293/143 |
| 3,352,588 | 11/1967 | Stancliffe | 293/143 |
| 3,574,406 | 4/1971 | Wessells | 293/143 |
| 3,831,921 | 8/1974 | Negado | 293/143 |
| 3,865,416 | 2/1975 | Burg | 293/142 |
| 4,168,855 | 9/1979 | Koch | 293/142 |
| 5,277,465 | 1/1994 | Weir | 293/143 |

FOREIGN PATENT DOCUMENTS 6-18165    3/1994    (JP) .

*Primary Examiner*—Joseph D. Pape
*Assistant Examiner*—Kiran B. Patel
(74) *Attorney, Agent, or Firm*—Smith, Gambrell & Russell, LLP

(57) ABSTRACT

An impact energy absorption structure for a vehicle, comprises left and right front frames having a closed section; left and right L-shaped stay members connected at a lower end thereof with the left and right front frames respectively and having left and right upper ends projected upward above the left and right front frame; and a bent member curved convexly in the forward direction of the vehicle and transversely connected at left and right ends thereof with the left and right upper ends respectively. The impact energy absorption structure is accommodated within a small space between the front bumper and the front end of the front frame and particularly it is suitable for vehicles having a short front over hang such as one box cars. As a result, at the event of a small collision, the impact energy is absorbed by the deformation of the impact energy absorption structure without operating an air bag.

9 Claims, 5 Drawing Sheets

IMPACT ENERGY ABSORPTION STRUCTURE FOR MOTOR VEHICLE

CROSS-REFERENCE TO RELATED APPLICATION

This application is a divisional of prior application Ser. No. 09/016,357 filed Jan. 30, 1998 U.S. Pat. No. 6,056,337.

BACKGROUND OF THE INVENTION

1. Field of the invention

The present invention relates to an impact energy absorption structure for a motor vehicle and particularly to an impact energy absorption structure for absorbing an impact energy when a vehicle has a head-on collision.

2. Prior Arts

The body front structure is primarily composed of left and right front frames connected with the inner side of a font wheel apron and having a closed section structure in the longitudinal direction of the vehicle, and a front bumper connected with each front end of the left and right front frames through a bumper stay. When a vehicle equipped with an air bag system has a head-on collision, first the front bumper is collapsed and then an impact load is inputted to the left and right front frames respectively through a bumper beam and a bumper stay. Then, the impact load is inputted to the left and right frames respectively and the impact energy is absorbed by a buckling deformation of the front frames. An air bag is operated when the impact load is inputted to the front frames. One example of this technology is disclosed in Japanese Utility Model Application Laid-open No. Jitsu-Kai-Hei 6-18165.

In case of the vehicle equipped with an airbag system, it is necessary to make a tuning of impact sensing in order to prevent a crash sensor from sensing an impact at the event of a light collision. For example, in the prior art shown in FIG. 5, the tuning is made by use of a bumper st ay connected to the front end of a front frame. That is, when an impact load is inputted, the impact energy is absorbed temporarily by the collapse of the bumper stay. In FIG. 5, "a" denotes a front frame, "b" denotes a front bumper, "c" denotes a bumper beam, "d" denotes a bumper stay, "e" denotes a toe board, "f" denotes a floor tunnel and "g" denotes a crash sensor. Generally, the front frame "a" is connected by butt welding at the rear end thereof with the toe board "e" and the crash sensor "g" is installed at a portion reinforced by a cross member (not shown)in the floor tunnel "f".

In this case, a certain length $L_1$ of crash stroke must be secured a t the front of the front frame "a", however, in case of vehicles having a relatively short front overhang like mini-cars and one-box cars it is difficult to establish an appropriate length of crash stroke between the front bumper and the front frame.

SUMMARY OF THE INVENTION

Thus, an object of the present invention is to provide an impact energy absorption structure capable of absorbing an impact force even in a vehicle having a small space for crash stroke between the front bumper and the front end of the front frame when the vehicle has a head-on collision.

An imp act energy absorption structure for a vehicle comprises: a left and right front frame having a closed section and provided in the longitudinal direction of the vehicle; a left and right L-shaped stay member connected at a lower end thereof with the left and right front frame respectively and having a left and right upper end projected upward above the left and right front frame; and a bent member curved convexly in the forward direction of the vehicle and transversely connected at a left and right end thereof with the left and right upper end respectively.

DETAILED DESCRIPTION OF THE PREFERRED EMBODIMENT

Figure 1A:
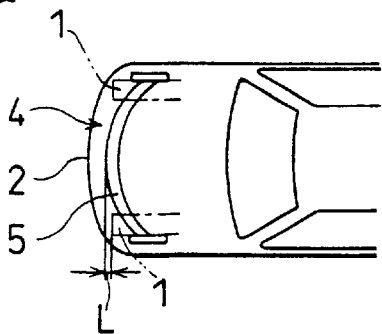
FIG. 1a is a top schematic view showing an impact energy absorption structure according to a first embodiment of the present invention.
Figure 1B:
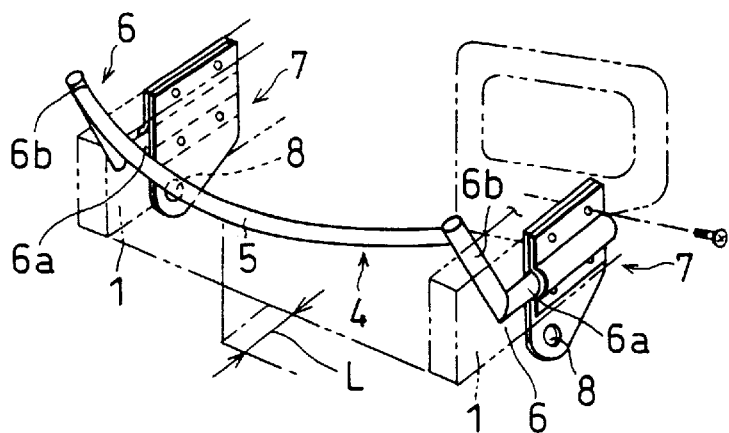
FIG. 1b is a perspective view of an impact energy absorption structure according to a first embodiment of the present invention.

Referring now to FIG. 1, numerals 1, 1 denote a left and right front frames and numeral 2 denotes a front bumper connected with the front end of the left and right front frames 1,1, respectively. The front frame 1 has a closed cross-section, being provided in the longitudinal direction . The front end of the front frame 1 comes near the rear side of the front bumper 2.

Numeral 4 denotes an impact energy absorption structure for absorbing an impact at a light collision. The impact absorption structure 4 is constituted by a bent member 5 constituted by a pipe bent convexly in the front direction of the vehicle and left and right stay members 6, 6 connected by welding with the left and right ends of the bent member 5 respectively. The stay member 6 is constituted by a mounting stay 6a which is extended longitudinally along the front frame 1 and a rising stay 6b which rises in the forward and oblique direction. The mounting stay 6a and the rising stay 6b are formed of a pipe, respectively. The rising member 6b of the stay member 6 is connected by welding at the upper end thereof with the left and right ends of the bent member 5, respectively.

Thus constituted impact energy absorption structure 4 is fastened to the side face of the front frame 1 with bolts and nuts through a bracket 7. Thus, the impact energy absorption structure 4 is mounted across the left and right front frames 1,1 in such a way that the bent member 5 is offset upwardly with respect to the front frame 1 and its forefront portion (widthwise center of the vehicle) is projected in the frontal direction with respect to the front end of the front frame. As a result, the forefront portion of the bent member S is close to the back surface of the outer skin of the front bumper 2.

The bracket 7 is constituted by a plate 71 connected to the side face of the front frame 1 and a clamp member 72 having a holder section 72a. Therefore, the mounting stay 6a of the stay member 6 is fastened to the side face of the front frame 1 with bolts and nuts being sandwiched between the plate 71 and the clamp member 72. Further, in an example shown in FIG. 1, the plate 71 is extended downwards from the front frame 1 and a towing hook 8 is provided at the extended portion of the plate 71.

Figure 2:
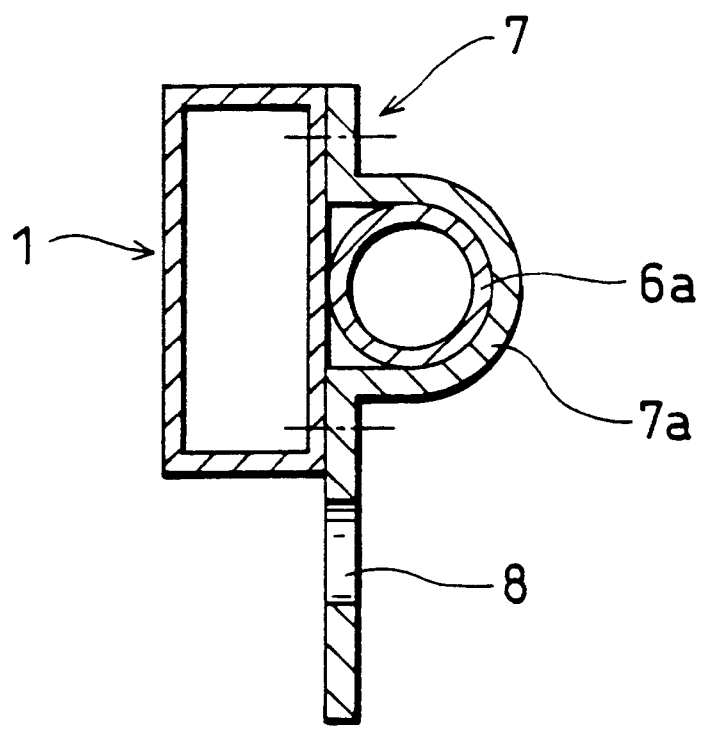
FIG. 2 is a cross-sectional view showing another variation of an impact energy absorption structure.

FIG. 2 shows another example of the bracket 7 which is constituted only by a clamp member 72. In this example, the mounting stay 6a is fastened to the side face of the front frame 1 with bolts and nuts being sandwiched between the side face of the front frame 1 and the holder section 72a of the clamp member 72. Also in this case, a towing hook 8 can be provided by extending the bracket 7 downwards.

Figure 1C:
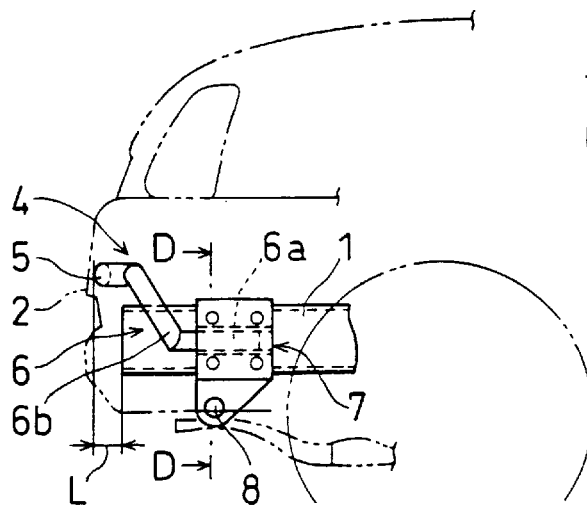
FIG. 1c is a side view of an impact energy absorption structure installed on a vehicle.
Figure 1D:
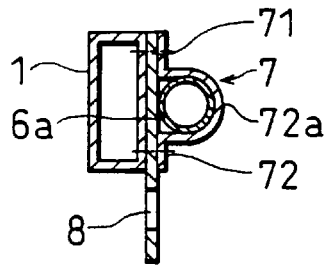
FIG. 1d is a sectional view taken along a line D—D.

Generally, even vehicles having a short front overhang like mini-sized cars and one box cars can secure a small longitudinal space "L" (for example around 50 millimeters) between the front end of the front frame 1 and the front bumper 2, as shown in FIG. 1c.

When the vehicle provided with the impact energy absorption structure 4 between the left and right front frames 1, 1 has a light head-on collision, an impact load is inputted from the front bumper 2 to the forefront portion of the bent member 5 and the bent member 5 is deformed. In this case, the bent member 5 is pushed backwards and is deformed in such a way that the left and right ends of the bent member 5 are expanded laterally. At the same time, the rising stay 6b of the stay member 6 is bent outwardly about the mounting portion by the bracket 7.

The resistance force generated when the bent member 5 and the stay member 6 are deformed is established below a value not operating the crash sensor "g" mounted in the center tunnel and accordingly in case of a small (light) collision the absorption of the impact energy is performed within a limit "G" (impact sensing G expressed in gravitational acceleration) for firing an air bag, thereby an erroneous operation of the air bag can be prevented.

On the other hand, when the vehicle has a large (heavy) head-on collision, after the impact energy absorption structure 4 has absorbed the impact energy within a specified stroke "L", the impact load is inputted to the front end of the front frame 1. When the crash sensor detects an impact "G" larger than a limit "G", the air bag is fired and at the same time the impact energy is absorbed by the buckling deformation of the front frame 1.

Figure 3:
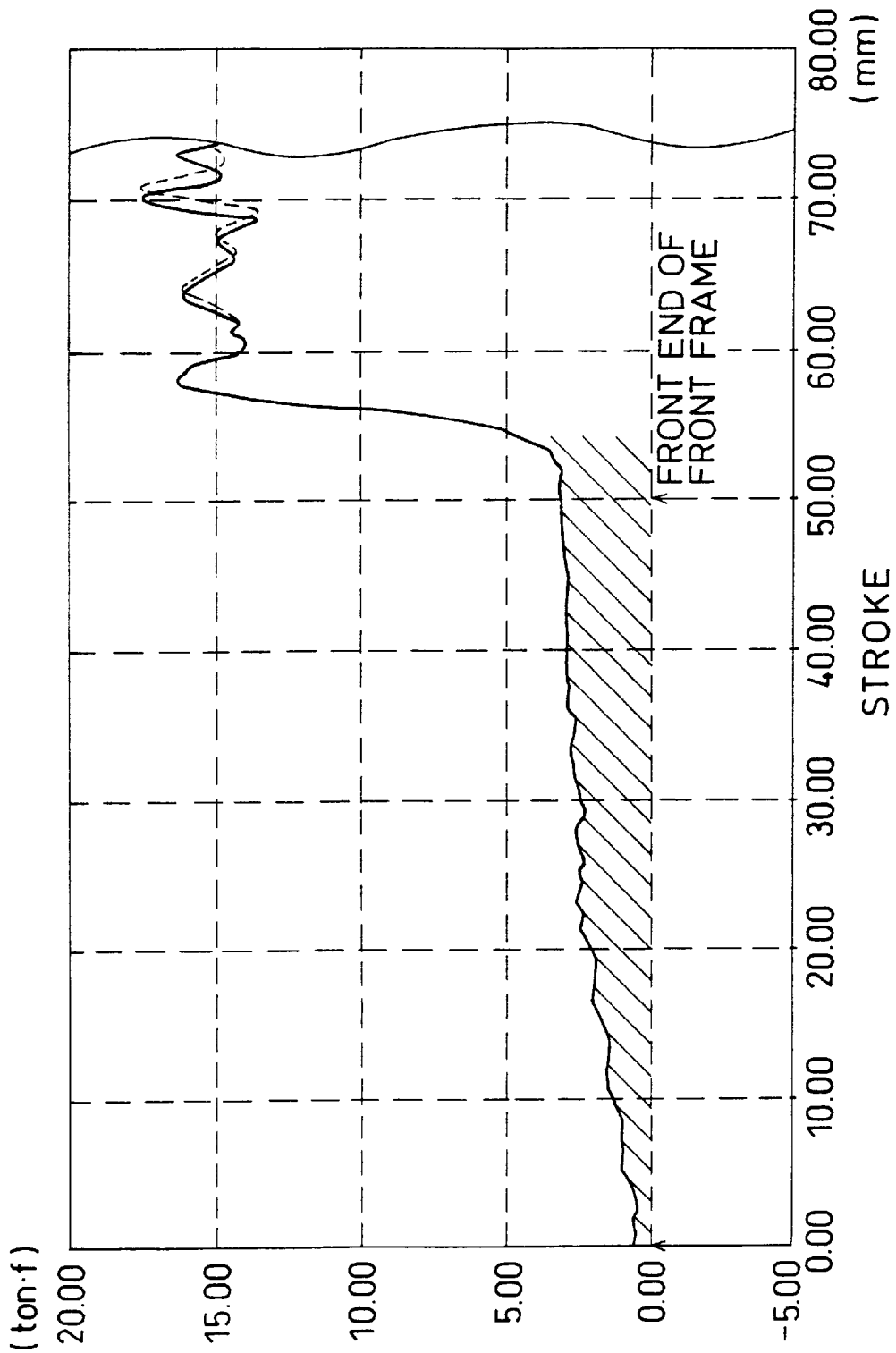
FIG. 3 is a graphical illustration showing an impact energy absorption characteristic of an impact energy absorption structure.

FIG. 3 shows a result of an impact experiment on the impact energy absorption structure according to the first embodiment. In FIG. 3, a hatched area indicates an impact energy absorption zone by the impact absorption structure 4. The barrier load (resistance force) in this zone is smaller than a lowest set value (approximate 5.00 ton·f) of an impact sensing G of the crash sensor, therefore the crash sensor detects no impact and an air bag does not work. When the deformation stroke reaches around 50 millimeters, the barrier load is inputted to the front end of the left and right front frames 1,1 and the resistance force is sharply increased. Then, the crash sensor detects an impact G and the air bag is operated. The front frame 1,1 starts a buckling deformation from the front end thereof to absorb an impact energy. Thus, at the event of a small collision, since at the initial stage of impact the impact energy absorption structure 4 absorbs an impact energy within a stroke of approximate 50 millimeters, there is no operation of the air bag. At the event of a large collision, since the impact energy absorption structure 4 absorbs a substantial amount of the impact energy at the initial stage, the peak value of the resistance force of the front frame 1 can be reduced and at the same time an overall crash stroke can be saved.

Figure 4A:
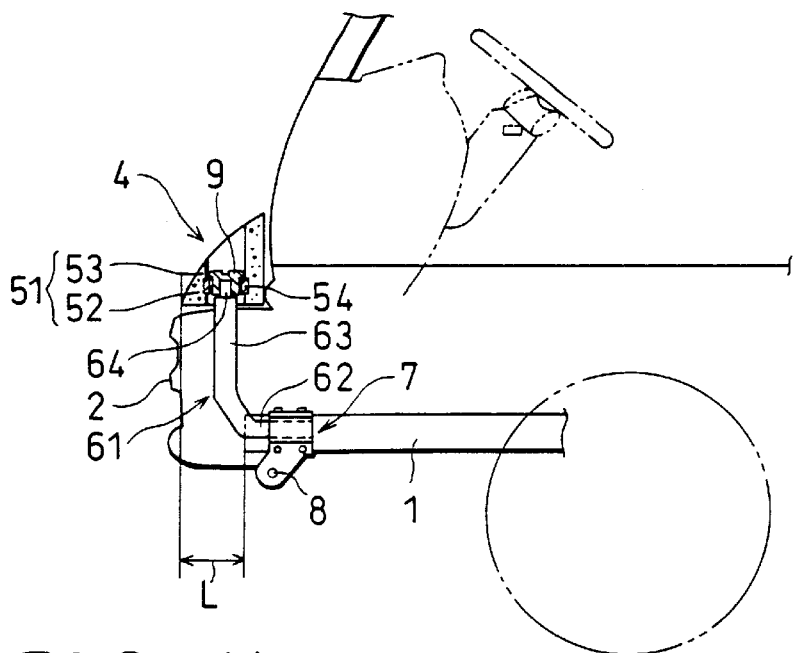
FIG. 4a is a side view of an impact energy absorption structure according to a second embodiment of the present invention.
Figure 4B:
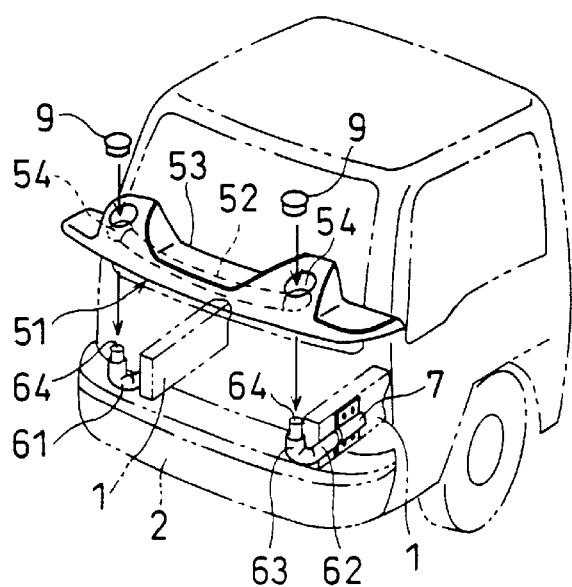
FIG. 4b is a perspective view of an impact energy absorption structure according to a second embodiment of the present invention.
Figure 4C:
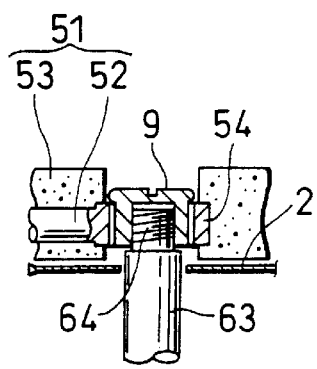
FIG. 4c is a cross-sectional view showing a connecting section of a curved member with a stay member.
Figure 5:
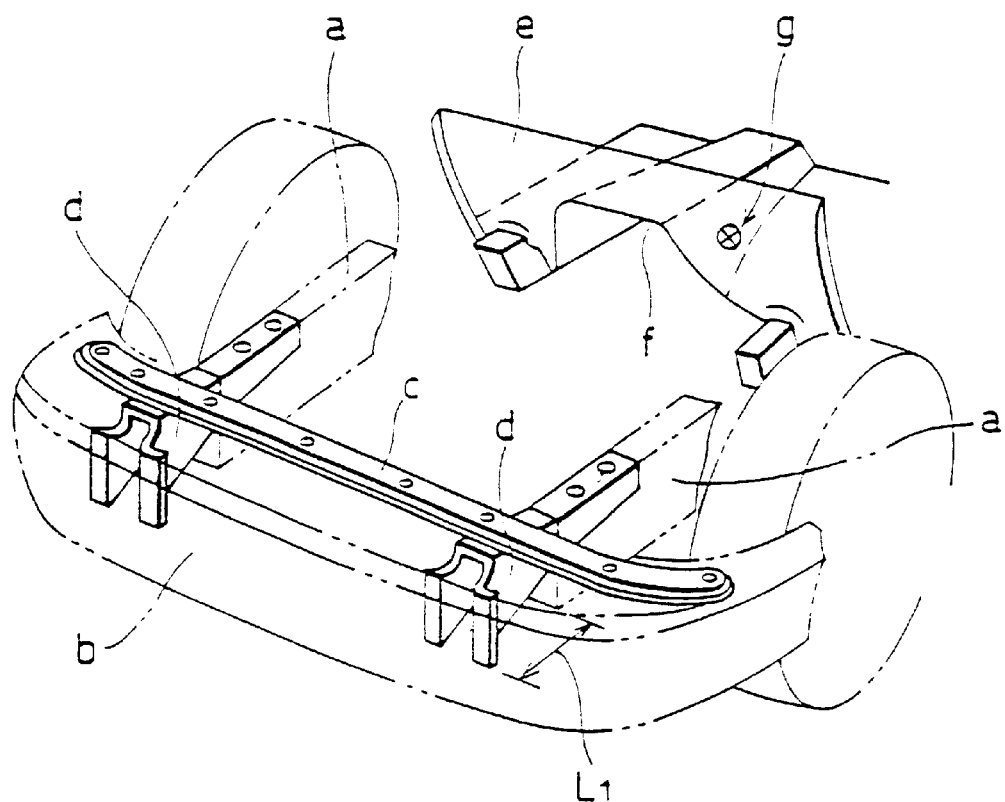
FIG. 5 is a perspective view showing an example of an impact energy absorption structure according to a prior art.

FIG. 4a to FIG. 4c show a second embodiment of the present invention, in which the impact energy absorption structure 4 comprises a bent member 51 for transversely connecting the front ends of the left and right front frames 1,1 and a stay member 61 for connecting the left and right ends of the bent member 51 with the left ad right front frame 1, 1 respectively. Thus, the bent member 51 is installed between the left and right front frames 1,1 in a state that it is put on the front bumper 2.

Describing in more detail, the bent member 51 is formed by a skeleton member 52 fabricated of pipe, bar, square closed section material and the like and by a stress absorption member 53 fabricated of elastic synthetic resin like urethane foam. Further, there are provided with mounting bosses 54, 54 for connecting the bent member 51 at the left and right ends of the skeleton member 52 with the left and right stay members 61, 61.

The stay member 61 is made of pipe comprising a mounting stay 62 extended longitudinally along the front frame 1 and a rising stay 63 rising from the front end of the mounting stay 62, forming "L" shape when viewed transversely. The rising stay 63 has a threaded section 64 at the upper end thereof.

When the stay member 61 is fastened to the side face of the front frame 1 through the bracket 7 in the same manner as in the first embodiment, the rising stay 63 rises from the front end of the front frame 1 with its upper end projected above the upper face of the front bumper 2. After that, the bent member 51 is put on the front bumper 2 and the rising stay 63 is fitted at the upper end thereof to the mounting boss 54 of the skeleton member 52. Then, the bent member 51 is screwed to the threaded section 64 of the rising stay 63 with a fastening cap 9. Thus, the bent member 51 is rotatably and removeably fixed to the stay member 61. In this state, the forefront portion of the bent member 51 is projected ahead of the front end of the front frame 1 by "L" (for example approximate 50 millimeters) and the bent member 51 is offset upwardly above the front end of the front frame 1. Although a towing hook 8 is not shown in FIG. 4a, it may be provided by extending the bracket 7 downwards.

In thus constituted impact energy absorption structure, when the vehicle has a small head-on collision, an impact load is inputted to the front bumper 2 and almost simultaneously to the forefront portion of the bent member 51. First, the front bumper 2 is collapsed and then almost at the same time the stress absorption member 53 is deformed elastically. On the other hand, simultaneously the skeleton member 52 is also deformed. Hence, the impact energy is absorbed through the deformation of these components. The resistance force of the bent member 51 is established to be a lowest set value of the impact sensing G of the crash sensor, thereby the air bag is prevented from being fired unnecessarily.

When the vehicle has a large collision to the extent that the bent member 51 is deformed beyond a limit "L" of the deformation stroke, an impact load is inputted to the front end of the front frame 1 and the crash sensor detects a collision.

Thus constituted impact energy absorption structure has an impact absorption characteristic similar to the one shown in FIG. 3, therefore it has the same operation and effect as the first embodiment. Further, according to the impact energy absorption structure shown in FIG. 4, when the vehicle has a small collision, since the bent member 51 is bent backward and at the same time the bent member 51 is rotated around the connecting section with the stay member 61, the stay member 61 is free from deformation and therefore the repair cost can be reduced. Further, since the bent member 51 is integrally molded with a stress absorption member 53, the bent member 51 itself can be a proprietary component.

In the examples shown in the first and second embodiments, the stay members 6 and 61 are mounted on the side face of the front frame 1, however they may be mounted on the upper face or the inner face of the front frame 1.

Further, the impact energy absorption structure according to the present invention is suitable for mini-sized cars or one box cars having a short front over hang, however this impact energy absorption structure can be applied to vehicles having a relatively long front over hang, too.

As described above, according to the present invention, since the impact energy absorption structure comprises the bent member which is bent forward and the stay member which holds the bent member, and since the bent member is projected ahead of the front frame, when the vehicle has a small impact, the impact energy inputted to the bent member is absorbed by the deformation of the bent member and the air bag is not operated. When the vehicle has a large impact, after the bent member is deformed, the impact energy is inputted to the front frame and the crash sensor detects an impact to operate the air bag. Thus constituted impact absorption structure not only has a very simple structure but also it is able to prevent an unnecessary operation of the air bag in vehicles having a small space between the front bumper and the front end of the front frame at the event of a small collision.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. An impact energy absorption structure for a vehicle having a front bumper, comprising:

a left and right front frames having a closed section and provided in the longitudinal direction;

a left and right stay member connected at a lower end thereof with said left and right front frame respectively and having a left and right upper end projected upward above said left and right front frame; and a bent member curved convexly in the forward direction of said vehicle and transversely connected at a left and right end thereof with said left and right upper end respectively, wherein said bent member includes a skeleton member curved convexly in the forward direction of said vehicle and a stress absorption member enclosing said skeleton member therein.

2. The impact energy absorption structure according to claim 1, wherein said skeleton member is fabricated of a pipe.

3. The impact energy absorption structure according to claim 1, wherein said skeleton member is fabricated of a bar.

4. The impact energy absorption structure according to claim 1, wherein
said skeleton member is made of a square closed section material.

5. The impact energy absorption structure according to claim 1, wherein
said stress absorption member is fabricated of synthetic resin having elasticity.

6. The impact energy absorption structure according to claim 1, wherein said left and right stay member is fabricated of a pipe.

7. The impact energy absorption structure according to claim 1, wherein said bracket has a towing hook at an extended portion thereof.

8. The impact energy absorption structure according to claim 1, wherein said bent member is put on said front bumper.

9. The impact energy absorption structure according to claim 1, further comprising:

mounting boss provided at both left and right ends of said skeleton member for connecting said bent member with said left and right stay member;

a threaded section formed at an upper end of said stay member and fitted into said mounting boss; and a fastening cap for fastening said bent member and said stay member with said threaded section.

* * * * *